United States Patent Office 3,606,568
Patented Sept. 20, 1971

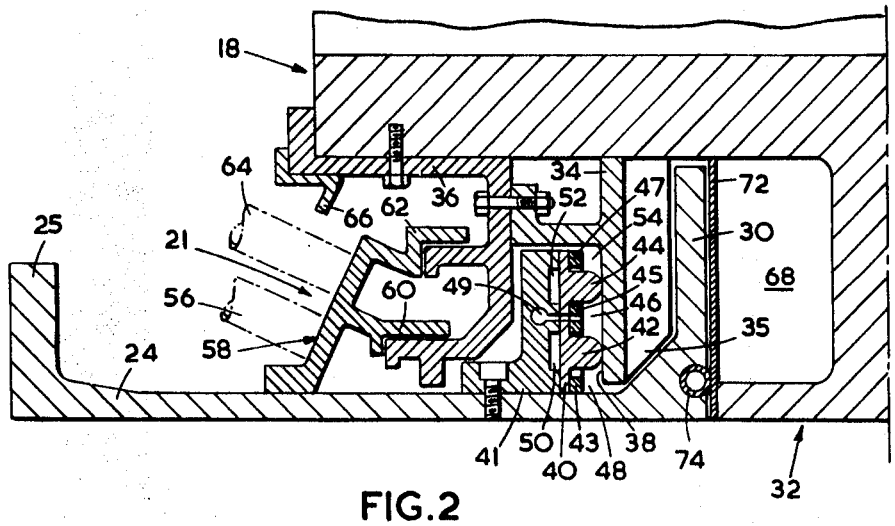
FIG.2
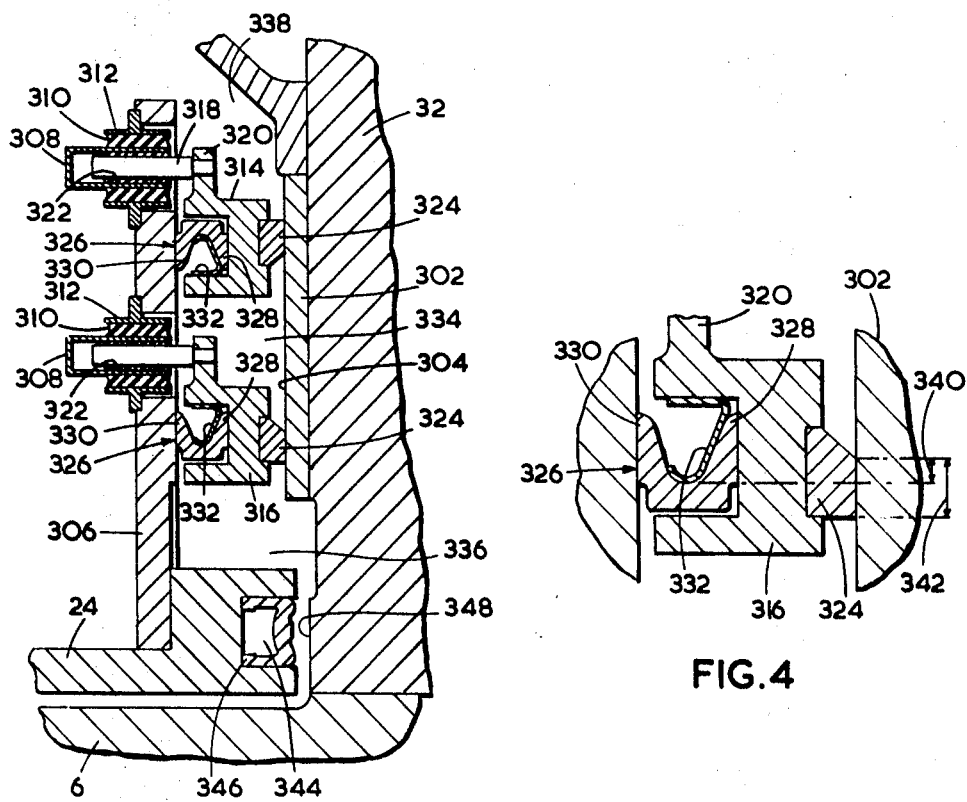
FIG.3
FIG.4

3,606,568
WATER TURBINES AND PUMPS
Michael Braikevitch and Emil Goldwag, Netherton, England, assignors to The English Electric Company Limited, Strand, London, England
Filed Mar. 5, 1969, Ser. No. 804,438
Claims priority, application Great Britain, Mar. 5, 1968, 10,672/68
Int. Cl. F01b *11/08;* B65d *53/00*
U.S. Cl. 415—175
5 Claims

ABSTRACT OF THE DISCLOSURE

The invention relates to water turbines and pumps.

The invention provides a water sealing means for reducing to a low value the escape of water from the water flow duct of such a machine between cooperating stationary and rotating parts thereof. In such sealing means one of the said parts carries a rigid circular sealing surface, and the other carries a flexible compliant circular sealing surface which is automatically controlled at all parts around its circumference to lie closely adjacent but not touching the rigid sealing surface, by two opposing forces provided respectively by a biasing fluid under pressure and by the water escaping between the rigid and compliant sealing surfaces.

---

The invention finds particular application in water turbines and pumps in which the runner carries directly therearound the rotor of a dynamo-electric machine, for limiting the escape of water between cooperating ends of the turbine tube and the rotor of the electrical machine.

This invention relates to water turbines and pumps. In such machines sealing means are provided for reducing the rate of escape of water under pressure from the water flow duct of the machine between opposing stationary and rotating parts thereof.

In the past such machines have been of such physical size that co-operating sealing parts formed on associated stationary and rotating parts of the machine could be machined readily and accurately to close tolerances. Hence such sealing parts have comprised rigid parts between rigid sealing surfaces of which small clearances have remained constant under all conditions of operation; thus the rate of escape of water through such clearances has remained constant at a desired low value.

At the present time, however, hydraulic machines are being envisaged of such size and construction that it has become impracticable to adopt the same form of sealing means, on account of the difficulties in practice of machining very large and heavy parts to such close tolerances. For example, it is expected that for turbines for low-head tidal-flow schemes turbine runners having an external rim diameter of between 20 and 30 ft. and a weight of some hundreds of tons will be required. In such turbines the runner carries directly around its periphery the rotor of an electrical generator which is to be driven by the turbine. It is expected that the axial clearances between the fixed parts of such a turbine and the rim of the turbine runner may vary by as much as ⅜″ in operation.

Thus the sealing means for use between such stationary and rotating parts must be able to accommodate such large variations in clearance. Furthermore, it has to be remembered that co-operating sealing parts will become defective if allowed to make physical contact with one another, due either to wear or distortion.

According to the present invention sealing means for reducing to a desired low value the rate of escape of water under pressure from the water flow duct of a water turbine or pump between opposing stationary and rotating parts thereof comprises a first sealing member carried on one of the said parts and having a rigid circular sealing surface, a second sealing member carried on the other of said parts and carrying in a water-tight manner a compliant flexible sealing ring which is disposed concentrically with and extending towards (but not touching) the rigid sealing surface so as to present thereto a compliant flexible sealing surface, the second sealing member having formed therein passages which communicate on the one hand with a source of fluid under pressure and on the other hand with the side of the flexible sealing ring which adjoins the second sealing member so that fluid under pressure from the said source extends the sealing ring in the direction of the rigid sealing surface to the extent that the clearance between each circumferential section of the sealing ring and the rigid sealing surface is reduced to a desired low value at which the force acting to extend the section is balanced by an opposing force applied to the section by water escaping between the section and the adjacent rigid sealing surface.

If desired the second sealing member may carry a second and similar compliant flexible sealing ring disposed coaxially with the first-mentioned flexible sealing ring and likewise cooperating with the rigid sealing surface. In such a case the second sealing member may include other water passages which communicate on the one hand with a source of water free of abrasive particles (hereafter referred to as "filtered water") and at a pressure greater than that in the water flow duct of the turbine or pump and on the other hand with the space enclosed between the two flexible sealing rings and the rigid sealing surface, so that the two sealing rings are maintained in stable states of extension by forces exerted on them by the escape of filtered water past them, the escape of water from the water flow duct of the turbine or pump between the said parts thereof being prevented by the ingress into the said water flow duct of filtered water.

Preferably, the first sealing member is carried on the said rotating part of the turbine or pump, the second sealing member being carried on the said stationary part of the turbine or pump.

In a preferred arrangement the rigid sealing surface comprises a substantially flat annular surface lying perpendicular to the axis of rotation of the said rotating part of the turbine or pump, and each flexible sealing ring extends axially towards the annular rigid sealing surface under the opposing forces acting thereon whereby to reduce the rate of escape of water radially across the rigid sealing surface.

One straight-flow water turbine with a rim-mounted electrical generator, according to the present invention, will now be described by way of example and with reference to the accompanying drawings, in which:

FIG. 2 shows to a much larger scale a small part of the arrangement seen in FIG. 1, to show the detailed construction of the sealing arrangement for reducing the escape of water from the turbine tube into the generator structure;

FIG. 3 shows to a similarly large scale the detailed construction of an alternative form of sealing arrangement; and FIG. 4 shows to a still larger scale a part of the sealing arrangement shown in FIG. 3.

Figure 1:
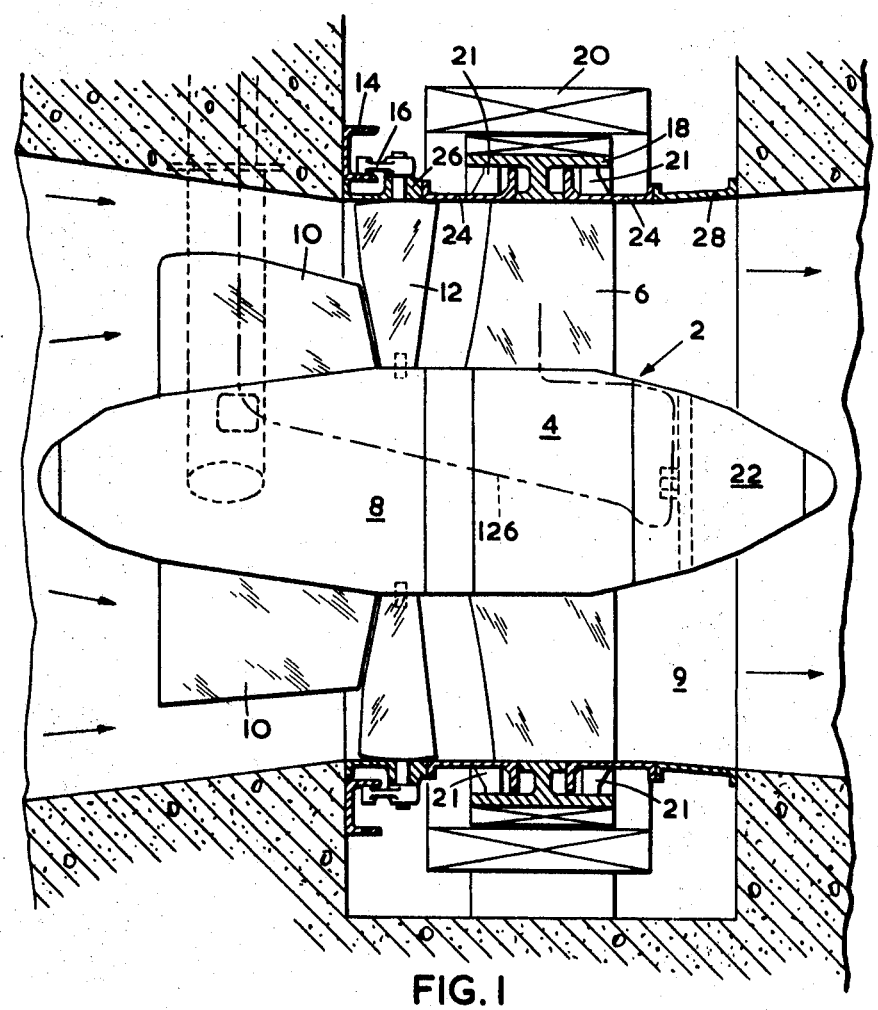
FIG. 1 shows diagrammatically the general arrangement of the turbine and generator, seen from the side with some parts shown in section.

Referring now to FIG. 1, the turbine consists of a runner 2 including a hub assembly 4 with four blades 6. The hub is mounted on a bearing arrangement which is carried in an over-hung fashion from a stationary nacelle 8 which is itself carried centrally within the tube 9 by four vanes 10. Upstream of the runner there are a number of adjustable control blades 12 which are adjustably pivoted about radial axes, the angle of inclination of all the blades 12 being varied by rotating a control ring 14 about the axis of the turbine. The ring 14 is pivotally connected to crank arms 16 on the outer trunnions of the blades 12.

The turbine drives a generator consisting of a rotor 18 secured directly around the turbine runner, and a stator 20 surrounding the rotor. It will be seen that the rotor 18 lies outside the bore of the tube 9 containing the turbine runner, so as not to obstruct flow through the tube.

A nose cone 22 is secured to the hub assembly 4 to provide streamlining downstream of the runner.

There are two annular seals 21 acting between the rotor 18 and two removable tubular parts 24 disposed on opposite sides of the rotor 18. The seals are shown only in outline in FIG. 1 and in detail in FIG. 2.

The removable tubular parts 24 of the turbine tube have flanges 25 bolted upstream to an annular part 26 and downstream to an annular part 28 respectively. As shown in FIG. 2 the end of each tubular part 24 adjacent to the generator rotor is formed with a flange 30 which lies between a central body portion 32 of the rotor and an annular member 34 which is secured to the rotor via a further annular member 36. The member 34 defines a flat rigid annular sealing face 38 with which a compliant flexible sealing ring 40 co-operates.

On its face opposite to the sealing face 38 the member 34 is formed with a number of circumferentially spaced curved vanes 35 which act somewhat as a centrifugal pump impeller and resist inward flow of leakage water between the flange 30 and the member 34, thus reducing the load on the seal.

In the example shown, the ring 40, which is of rubber or some other similarly compliant flexible material, consists of a web portion with inner and outer coaxially extending annular projections 42 and 44 which actually serve as the sealing parts of the ring which co-operate with the sealing surface 38 of the member 34. The web portion is clamped against a stationary annular part 41 by three annular plates 43, 45 and 47 of which the plate 45 engages between the annular projections. The annular part 41 is secured in a water-tight manner around the tubular part 24. The recess between these annular projections 42 and 44 provides an annular chamber 46 to which filtered water (that is water free of abrasive particles such as sand) is fed via a passageway 49, the pressure of this filtered water being maintained greater than the water pressure within the turbine tube, so that water from the turbine tube cannot leak radially outwards past the inner projection 42 from the space 48 which communicates circuitously with the inside of the turbine tube during operation.

Water at an appropriately selected pressure is also fed to annular chambers 50 and 52 behind the projections 42 and 44 so as to urge the projections axially towards the sealing member 34. The forces on the sealing ring projections produced by the pressures in the chambers 50 and 52 are opposed by forces due to the fluid pressures acting on the opposite sides of the sealing ring projections, that is to say by the pressures in the annular space 48, in the annular chamber 46, and in an outer annular space 54 into which some water leaks from the annular chamber 46 past the projection 44. These pressures tend to urge the sealing ring projections away from the sealing surface of the member 34. Balance is achieved for each sealing projection because the pressure of the filtered water on each projection decreases as the projection moves away from the member 34 and allows the flow of water escaping from the chamber 46 to rise. This is because the flow velocity past each projection increases as the clearance increases, with a consequent reduction in the pressure acting on the projection as pressure energy is converted into kinetic energy. In the balanced state a small controlled flow of filtered water occurs radially inwards past the inner seal (i.e. the projection 42) and radially outwards past the outer seal. The annular clamping plates may be integral rings or may consist of segments making up complete rings.

The two seals may be formed by two separate sealing rings comprising respectively the projections 42 and 44. In this case each ring may have inner and outer annular clamping plates securing the flange or web portions to the stationary part 41.

It should be noted that the water pressure in the turbine decreases towards the top of the tube. For example in the case of a 30 feet diameter runner, the pressure at the top is less than that at the bottom by a head of 30 feet of water. The pressure at the top, within the tube, may in fact be less than atmospheric. The pressure of clean water fed to the recess 46 must nevertheless be above atmospheric in order to prevent air entering the recess 46 past the outer sealing projection 44.

Axially extending holes at circumferential intervals may be formed through either or both of the annular projections 42 and 44, that is to say extending between the chamber 50 or 52 and the sealing face of the projection or projections. This may be necessary, depending upon the relative pressures acting on the sealing ring projections.

It should be noted that with this form of seal, substantially no dirty water from the turbine tube can flow past the seal. This is important because water in the turbine tube may carry sand and grit which would tend to wear away the sealing faces. Water leaking outwards past the outer projection 44 of the sealing ring and into the space 54 is pumped out through a pipe 56 connected to a stationary water-tight casing member 58 which is itself secured around the tubular member 24. The member 58 has a cylindrical part 60 forming a sealing surface which co-operates loosely with part of the member 36, and a further cylindrical part 62 which also forms a sealing surface which co-operates loosely with part of the member 36. Any water which is not drawn out through the pipe 56 and which passes the running seal at 60 can be drawn out by a further pipe 64, and any water which actually passes the running seal at 62 is thrown away from the generator stator by a deflector 66. The pipes 56 and 64 though indicated in FIG. 2 are in fact located at the bottom of the member 58.

The inner body portion 32 of the generator rotor is formed with recesses 68 for the sake of lightness. Each recess 68 extends circumferentially until just short of a runner blade, so that the rotor body portion 32 is solid in the region lying immediately either side of each runner blade. The rotor is secured to the runner blades by fastening means not shown. On opposite sides of the rotor body portion 32 there are cover plates 72 extending over the recesses 68 and lying close to the flange 30 of the tube portions 24. The flange 30 in each case has a recess partly containing a circumferentially extending flexible tube 74 which can be expanded by internal fluid pressure to seal against the plate 72 and therefore isolate the other seals completely from water in the turbine tube. This is done when the turbine is stationary and when the seals described above are being inspected.

Means may be included for pressing the sealing rings firmly against the sealing surfaces 38 to provide a good mechanical seal while the turbine is stationary.

As an alternative to the arrangement shown, the flange 30 and member 34 could be omitted, and the sealing ring could act directly on the plate 72 or on some other part secured against the rotor body 32.

The double seal shown in FIG. 2 is suitable for a turbine powered by sea water carrying a certain amount of sand. If the turbine is powered by clean fresh water, the outer annular projection 44 of the sealing ring may be omitted: the projection 42 then acts as a hydrostatic seal in a balanced condition, with pressure in the chamber 50 holding the projection 42 close to but just clear of the sealing member 34, against the action of pressure on the convex, opposite face of the projection 42. However, if the pressure at the top of the tube is below atmospheric pressure, a double seal is necessary even in a clean water installation in order to prevent air entering the recess 46.

The double sealing ring shown in FIG. 2 may be replaced by a more solid ring formed with a shallow recess in the sealing face which leaves two annular lands serving like the projections 42 and 44 in FIG. 2, for clean water being fed to the recess through axial holes as before.

Referring now to the alternative sealing arrangement shown in FIGS. 3 and 4, a side wall of the rotor body 32 carries an annular plate 302 whose radially extending surface 304 constitutes a substantially flat rigid sealing surface which moves with the rotor.

The tubular member 24 enclosing the turbine runner vanes 6 has secured thereto in a water-tight manner an annular plate 306 facing but axially spaced from the rotor sealing surface 304.

Located in the annular plate 306 are two rings of circumferentially-spaced resiliently-mounted sockets 308, each such socket being carried in a water-tight manner in a rubber-ferrule 310 which is itself bonded in a flanged tubular mount 312.

Disposed between the rotor sealing surface 304 and the annular plate 306 are two annular shell members 314, 316 disposed coaxially with one another, and being supported in position by pins 318 carried on lugs 320 secured to the outersurfaces of the shell members. The pins are slidably carried in the sockets 308 on nylon sleeves 322 so as to enable movement of the shell members freely in an axial direction.

Each shell member has a generally U-shaped cross-section and carries on its closed end an annular sealing element 324 of rubber, which co-operates with the rotor sealing surface 304 to provide a water seal. Carried within each shell member is a rubber closure member 326 generally of U-shaped cross-section, and having one limb 328 sealing against an inner surface of the shell member, and the other limb 330 sealing against the adjacent surface of the annular plate 306. Each closure member is held in position within its shell member by a spring clip member 332.

The closure members have their U-shaped cross-sections oppositely directed so as to provide stationary seals with the annular plate 306 and the shell members against the pressure of filtered water (that is water free of abrasive particles such as sand) admitted through passages (not shown) in the plate 306 to the space 334 which is bounded by the plate 306, the closure members 326, the shell members 314, 316, the sealing elements 324, and the rotor sealing surface 304.

Since in operation the supply of filtered water is maintained at a pressure greater than that in the turbine tube 9 the pressure in the space 334 exceeds that in the annular space 336 enclosed by the inner shell member, so that filtered water escapes between the inner sealing element 324 and the rotor sealing surface 304 into the turbine tube.

Likewise, filtered water escapes outwards between the outer sealing element and the rotor sealing surface into the space 338, and is removed by pumping.

At each circumferential part of each shell member the shell member is subject to opposing axial forces, that is to say, to a constant left-to-right force due to the uniform pressure in the space 334 acting on the annular area indicated by the radial arrow 340 in FIG. 4, and to a variable right-to-left force due to the non-uniform pressure acting on the annular sealing face area indicated by the radial arrow 342 (in FIG. 4) of the sealing element. Balance of these forces is achieved when the axial gap between the rotor sealing surface and the sealing element is at a desired low value.

Movement of the rotor sealing surface 304 for example to the right (due perhaps to deflection of the turbine runner under load, or inaccuracy in machining the rotor sealing surface 304) will result in an increase in the axial gap and a consequent increased rate of escape of filtered water. As a consequence of the increased velocity of the escaping water, the pressures in the gap decrease so that the balance of axial forces on the shell member is temporarily destroyed and the shell member follows the rotor sealing surface by moving towards the right to again reduce the gap dimension to the desired low value at which the shell member rests in equilibrium, with the rate of escape of filtered water held at a desired low value.

Axial movement of the shell members is facilitated by the pin and socket mountings, whilst changes in the attitude of the shell members, and even of their shape, can be accommodated by the resilient mountings of the sockets.

It should be noticed that in this sealing arrangement of FIG. 3, only the source of filtered water under pressure is required to obtain the desired operation of the sealing arrangement.

In a modification of the sealing arrangement described with reference to FIG. 3, the closure members 326 are replaced by inflatable capsules disposed within the shell members and fed from the source of fluid under pressure as used for the cavities 50 and 52 of FIG. 2.

In FIG. 3 the tubular member 24 carries in an annular channel 344 an isolating ring 346 of rubber which is slidable under pressure towards an isolating surface 348 formed on the rotor body 32. Fluid under pressure is admitted to this channel whenever it is desired to isolate the sealing arrangement from the turbine tube for inspection or maintenance of the sealing arrangement.

The various rubber sealing and closure members referred to in the above description may alternatively be made of any other compliant resilient material which is suitable for performing the desired functions.

It should be noted that the centrifugal pump action of the vanes 35 constitutes a feature which may be used with turbines other than that described. In particular, this feature may be used to reduce the load on the seals of a turbine having different sorts of seals in place of the seals 21.

For details of the bearing arrangement which supports the turbine runner from the nacelle the reader's attention is directed to the disclosure of the applicant's other patent application No. 804,446 filed concurrently.

We claim:
1. A seal for reducing water leakage between two relatively rotatable components of a machine, the seal including:
   means associated with one of the components and defining a rigid circumferentially extending sealing surface; and
   two coaxial flexible sealing rings each carried in a resilient water-tight manner by the other component and extending towards the said sealing surface, wherein the improvement comprises:
   the said other component having defined therein passages through which a fluid can be fed under pressure to urge the sealing rings towards the said sealing surface from initial unpressurized positions in which they are clear of the said sealing surface to reduce the clearances therebetween until the forces applied to the sealing rings by the said fluid under pressure is balanced by forces applied to the sealing rings by water passing through the said clearances.

2. A seal according to claim 1, wherein the two sealing rings define with the said sealing surface a circumferentially extending space and the said other component has defined therein passages through which filtered water can be fed under pressure to the space to then pass through the clearance between each sealing ring and the said sealing member.

3. A seal according to claim 1, wherein the two sealing rings are integral with a common flexible annular backing member which is attached to the said other component.

4. A seal according to claim 1, wherein the two sealing rings are separate from each other and are independently resiliently attached to the said other component.

5. A seal according to claim 4, wherein:
an annular shell member of U-shaped cross-section, the closed end of which section is presented toward the said sealing surface, is provided for each sealing ring, the sealing ring being attached to the said closed end;

slidable mounting means are provided for supporting the annular shell member on the said other component such that the annular shell member and sealing ring can together be urged towards the said sealing surface; and a circumferentially extending resilient sealing element is attached to the annular shell member and to the said other component so as to provide a resilient water-tight seal therebetween.

References Cited

UNITED STATES PATENTS

| | | | |
|---|---|---|---|
| 2,621,087 | 12/1952 | Kluge | 103—111 |
| 2,736,265 | 2/1956 | Higgins | 103—114 |
| 3,030,118 | 4/1962 | Groce | 277—59 |
| 3,183,841 | 5/1965 | Gaynor | 415—170 |
| 3,353,028 | 11/1967 | Braikevitch et al. | 290—52 |
| 3,422,275 | 1/1969 | Braikevitch et al. | 290—52 |
| 2,903,970 | 9/1959 | Elouitz et al. | 277—15 |
| 3,127,181 | 3/1964 | Grego et al. | 277—15 |
| 3,347,553 | 10/1967 | Schweiger | 277—74 |

FOREIGN PATENTS

| | | | |
|---|---|---|---|
| 835,097 | 3/1952 | Germany | 277—59 |

HENRY F. RADUAZO, Primary Examiner

U.S. Cl. X.R.

277—74; 290—52